United States Patent [19]
Plazier

[11] 3,809,376
[45] May 7, 1974

[54] METAL FACTORY WITH AT LEAST ONE TILTABLE CONVERTER

[75] Inventor: Nico Plazier, Castricum, Netherlands

[73] Assignee: Hoogovens Ijmuiden B.V., Ijmuiden, Netherlands

[22] Filed: Nov. 17, 1972

[21] Appl. No.: 307,375

[30] Foreign Application Priority Data
Nov. 16, 1971 Netherlands...................... 7115853

[52] U.S. Cl.................................. 266/16, 266/35
[51] Int. Cl............................................ C21c 5/40
[58] Field of Search...................... 266/13, 15–17, 266/35, 36 P; 75/60; 214/18 SC

[56] References Cited
UNITED STATES PATENTS
3,724,827   4/1973   Dortenzo............................ 266/15
3,537,694   11/1970  Rinesch et ak........................ 266/13
2,803,450   8/1957   McFeaters............................ 266/13

FOREIGN PATENTS OR APPLICATIONS
843,100   7/1949   Germany......................... 266/36 P Primary Examiner—Gerald A. Dost
Attorney, Agent, or Firm—Hall & Houghton

[57] ABSTRACT

A factory for the conversion of metal is provided which contains at least one tiltable metal converter, machinery for supporting, displacing and tilting either ladles for molten metal or charging boxes for scrap metal which are used to charge the converter, exhaust means for the converter during its normal operation, which exhaust means include hood means extending over the entire opening of the converter when in a tilted position during the charging of the converter with metal to be processed for carrying away and exhausting vapors, dust and the like that are present above the converter opening during the charging of the converter while in a tilted state, thereby providing a work area which will be substantially free of material hazardous to the health of the operator during such charging. The hood means further are movable transversely to the plane of the tilting movement of the charging vessel.

4 Claims, 3 Drawing Figures

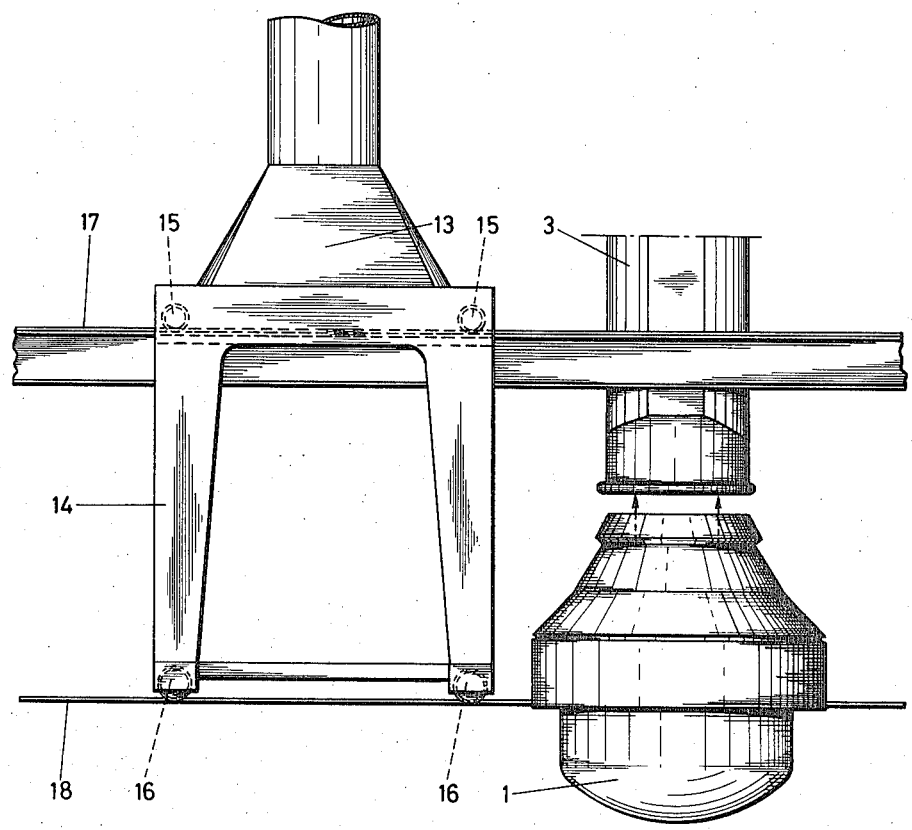

METAL FACTORY WITH AT LEAST ONE TILTABLE CONVERTER

This invention relates to a mill or factory for the conversion of metal and comprising at least one tiltable converter, machinery for supporting, displacing and tilting ladles for molten metal and charging boxes for scrap metal and means for sucking away and exhausting vapours above the converter opening during charging of the converter with molten metal and scrap metal. Such suction or exhaust means are often indicated as "secondary exhaust."

In the further specification the invention will mainly be described and explained with reference to steel factories, having one or more converters of the so-called L.D.- or oxygen steel type. However, the invention is not restricted thereto and may as well be applied when using other converters of types such as basic-Bessemer or Thomas converters, Bessemer converters, Kaldo-converters and the like.

During refining of the charge in the converter there is a very considerable development of clouds of dust and vapour. In order to restrict hindrance thereby to the environment, it is usual to apply an exhaust hood above the converter opening, so that the generated clouds of dust and vapour are sucked away, are cooled and are thereupon purified by separating the dust from the gas, which is the so-called primary exhaust.

However, clouds of dust and vapour are also generated to a lesser extent, but nevertheless also very annoying and troublesome, during charging of the converter with, e.g., pig iron from a pig iron ladle or transport ladle, and with scrap iron or the like from a scrap iron box. During such filling the converter is tilted away from the exhaust hood, so that the generated clouds for the greater part enter the factory hall, where they are quite annoying.

It has been tried to lessen this annoyance by applying suction openings in the vicinity of the converter opening in the tilted position of the converter, but up to now no satisfactory results have been obtained therewith.

It is an object of the present invention to give a solution for this problem.

It is remarked that when charging a converter such as a steel converter from a pig iron ladle such a ladle is usually moved to the proximity of the opening of the converter by an overhead crane and is thereupon tilted. This way of moving the ladle makes it difficult to apply adequate exhaust or suction systems for this position of the converter.

It is further remarked that it is known in factory buildings without an overhead crane to charge the pig iron or the like by positioning the ladle in a charging machine, being a vehicle provided with means to take up the ladle, to lift it and to tilt it. Such machines are also used frequently for charging scrap iron into the converter. The charging of pig iron with such charging machines is, however, only known in circumstances, where the type of furnace does not allow a charging by an overhead crane or where the problems of generation of dust and gases when charging are not deemed to be serious. This may be the case for small furnaces.

It has now appeared that according to the invention a solution for the above given problem may be obtained if when charging the converter use is made of such charging machines known as such and that, moreover, the suction means include a hood, which during charging extends over the entire opening of the converter and the opening of the ladle or open top surface of the scrap iron or charging box. As this allows gases, dust and vapours both from the converter and from the ladle or the charging box to be sucked away, it is possible to avoid almost all hindrance by dust and vapour clouds entering the factory building.

The best sucking away of dust is theoretically obtained if in any position of the charging ladle or scrap iron box or the like, the exhaust hood during charging conforms in shape and dimensions as nearly as possible to the converter opening and the opening of the ladle or box and is as close as possible thereto. It will, however, be clear that this causes a considerable complication of the structure of the exhaust system in view of the movements of converter and ladle or box and in view of the free passage for metal, etc., from ladle or box into the converter.

On the other hand it was not probable for the experts that a sufficiently good exhaust could be obtained if the suction hood was at a considerable height above the converter and charging ladle or box. This is so because it is known that the chance of catching gases and dust by a suction system decreases rapidly with the distance between such a hood and the zone where such gases and dust are generated or escape. It has, however, surprisingly appeared that according to the invention nevertheless a good exhaust is obtained if the hood is positioned at a height allowing an unobstructed tilting of the ladle and the charging box to and from the charging position. It is not necessary to provide the hood with a mechanism for displacing or adjusting the hood in height direction during the charging. It is, however, preferable when applying the invention to have the suction hood in the charging position extend to a zone very close to the back edge of the ladle or box tilted in its highest position.

In the case of a metal factory having more than one similar converters it is possible to apply a hood with exhaust system of the type described for each converter separately. It has, however, appeared that considerable savings in cost are possible if a single exhaust system is present, which according to the invention comprises a hood, which is displaceable in a direction transverse to the plane of the tilting movement of the charging machine from one converter to a next one. Contrary to the hood of the primary exhaust, which is usually cooled by water, the hood of the secondary exhaust needs only be lined with refractory masonry.

The invention not only relates to a steel factory provided with exhaust means of the type described, but also to a suction device for exhausting gases and vapours and dust generated during the charging of a converter or the like with liquid metal and scrap for use in such a factory and of a structure as described above.

The invention will now be explained in more detail with reference to the enclosed drawings, showing the important part of the factory and of the suction device by way of example only and somewhat diagrammatically.

FIG. 3 gives a side view according to the line III—III in FIG. 1.

Figure 1:
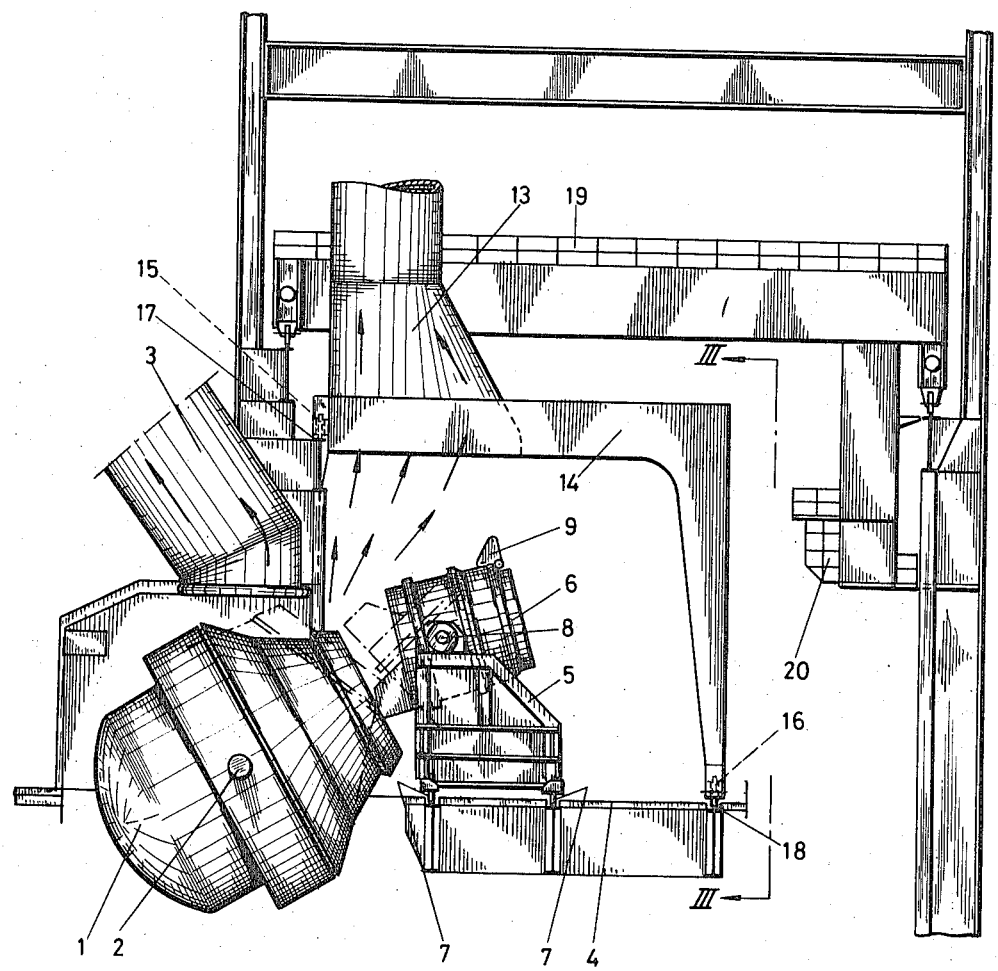
FIG. 1 shows a diagrammatic view of the important parts of a steel factory in which the invention is applied in elevation.

In the drawings reference numeral 1 indicates a steel converter tiltable by trunnions 2 in suitable supports not shown. Above the converter there is a fixed hood 3, connected to an exhaust and suction system with dust catchers and collectors, etc., not shown. Both the fixed hood 3 and the suction device with dust collectors, etc., may be of conventional design, in which the hood 3 may in the usual way be provided with a water-cooled jacket, etc. In normal operation the converter is in the vertical position as shown in FIG. 3, so that the opening of the converter is just below the lower edge of the hood 3.

In FIG. 1 the converter is shown in a position in which liquid pig iron is charged into it from ladle 6.

On the platform 4 a pig iron charging machine 5 is movable over rails 7 alongside the converter. The charging machine 5 includes a cradle 8 in which the ladle may be suspended and moreover it has means not shown for displacing the ladle. Usually the pig iron ladle is adapted not only to tilt in said charging machine, but also to make a horizontal movement thereon towards and away from the converter and a vertical movement. The ladle has a lug or ear 9 by which it is possible to connect the ladle by a cable or chain to an overhead crane such as 19 in order to tilt the ladle. It is, however, also possible to tilt the ladle by means provided on the charging machine 5. Dot and dash lines in FIG. 1 show the position of the converter opening and of the upper part of the ladle at the beginning of the charging with pig iron. During pouring of the ladle both the ladle and the converter will be tilted gradually towards the position shown in full lines.

Figure 2:
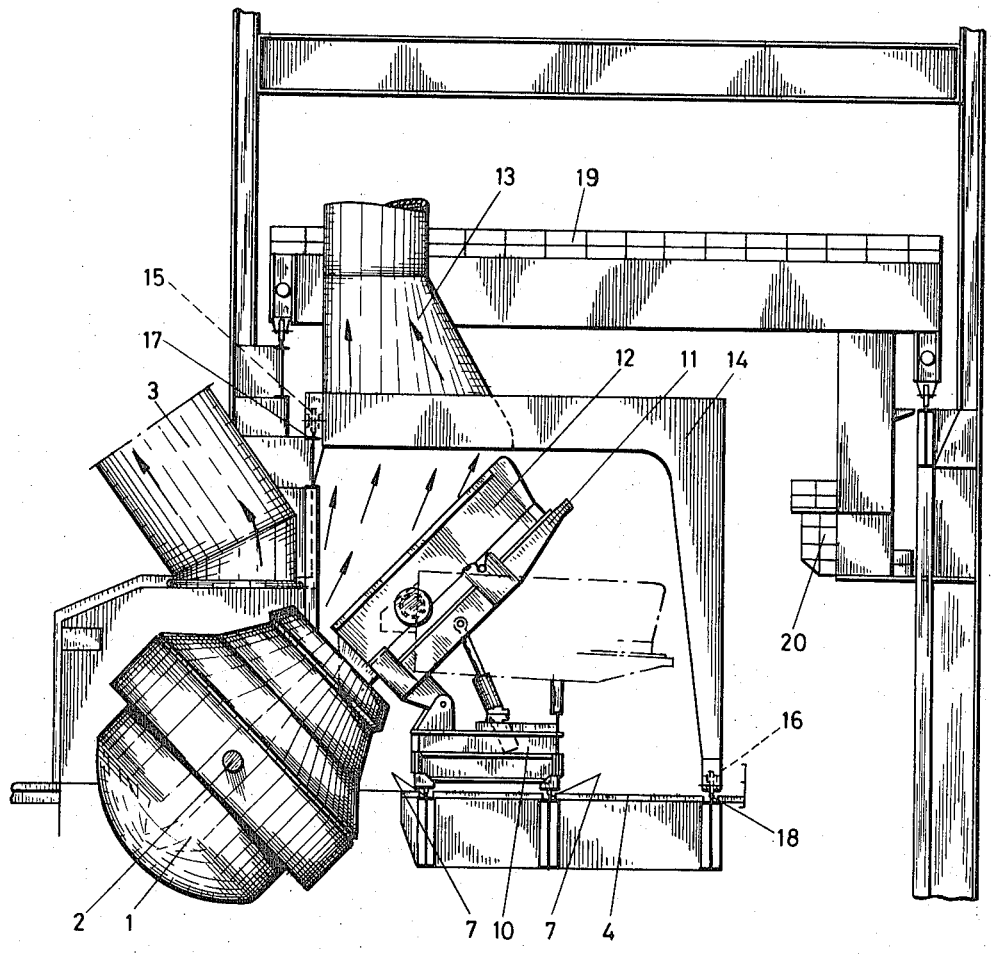
FIG. 2 shows the same steel factory in elevation in another phase of operation.

FIG. 2 shows the situation in which not pig iron but scrap iron is being charged into the converter. The scrap iron charging machine 10 may be of generally known type, including a cradle 11 adapted to take up a scrap iron box 12. In full lines FIG. 2 shows the scrap iron box in the charging position and dot and dash lines show this box in conveying position, in which the machine is moved over rails 7 towards and away from the converter, like the pig iron charging machine 5 of FIG. 1.

An exhaust hood 13 is connected to an exhaust system not shown in detail for the secondary exhaust. Hood 13 is connected to a portal structure 14 being movable perpendicularly to the plane of the drawing by two sets of wheels 15 and 16 over rails 17 and 18 respectively, This portal is movable parallel to the track of rails 7, for the charging machines, so that hood 13 is displaceable to positions above the opening of more than one conveyor in tilted position thereof. In the positions of the hood 13 above a tilted conveyor this hood is coupled to a rigid exhaust system which is independent of the exhaust system for hood 3 used in the steel manufacturing period.

As appears from FIG. 2, hood 13 extends substantially above the entire opening of the converter and the open upper surface of the scrap iron box 12. This hood 13 extends very close to the back edge of the scrap iron box in its tilted position. The dust laden gas stream from the converter is thereby guided in part by the scrap iron box itself almost entirely into the hood 13. It has appeared that also when charging the converter with pig iron as shown in FIG. 1 in this way the entire dust laden gas stream from the converter flows into the hood 13.

FIGS. 1 and 2 also show an overhead crane 19 with cabin 20 used for the conveying of the ladle 6 to the pig iron charging machine 5 and, if desired, for other purposes.

I claim:

1. In a mill for conversion of metal having at least one tiltable metal converter, machinery for suspending, moving and tilting a charging vessel used to charge the converter with molten metal or scrap iron, and exhaust means for sucking vapors and dust from the opening of the converter during the charging thereof, the improvement of said exhaust means which comprises suction hood means which, during the charging of the converter extends above substantially the entire converter opening in its tilted position, said suction hood means being movable transversely to the plane of the tilting movement of the charging vessel.

2. A mill in accordance with claim 1, wherein the suction hood means are positioned at a height above the converter sufficient to permit an unobstructed tilting movement of the charging vessel to and away from the charging position.

3. A mill in accordance with claim 2, characterized in that the suction hood means extend, when charging the converter, in a charging position in close proximity to the back wall of the charging vessel when same is in its highest position.

4. A mill in accordance with claim 1, wherein the suction hood means are lined interiorly with refractory material.

* * * * *

UNITED STATES PATENT OFFICE
CERTIFICATE OF CORRECTION

PATENT NO. 3,809,376

DATED : May 7, 1974

INVENTOR(S) : Nico Plazier

It is certified that error appears in the above-identified patent and that said Letters Patent are hereby corrected as shown below:

In the Caption, item 30, for

"November 16, 1971" read --November 17, 1971--

Signed and sealed this 10th day of June 1975.

(SEAL)
Attest:

RUTH C. MASON
Attesting Officer

C. MARSHALL DANN
Commissioner of Patents
and Trademarks